A. FRONCZAK.
HARROW.
APPLICATION FILED APR. 15, 1919.
1,329,118.
Patented Jan. 27, 1920.
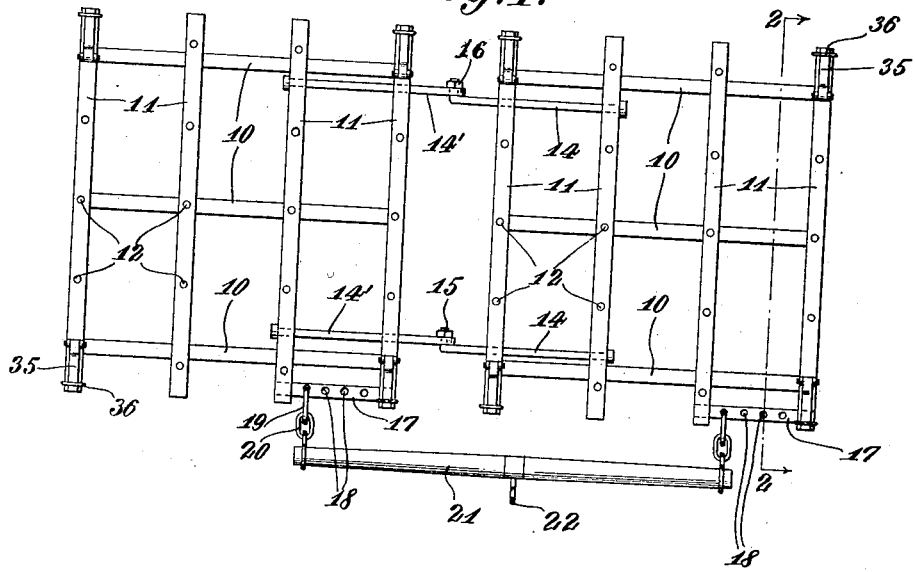
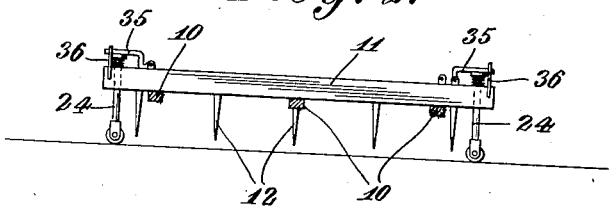
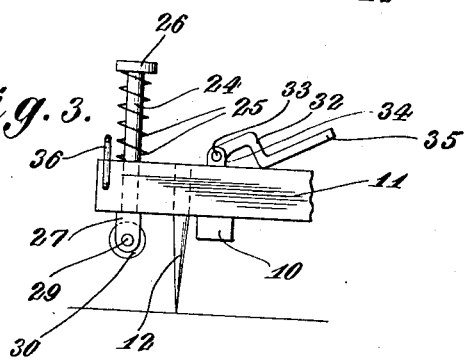  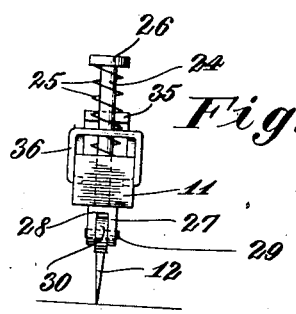
INVENTOR
Antoni Fronczak.
Frederick Myers
his ATTORNEY

UNITED STATES PATENT OFFICE.

ANTONI FRONCZAK, OF WILKES-BARRE, PENNSYLVANIA.

HARROW.

1,329,118.   Specification of Letters Patent.   Patented Jan. 27, 1920.

Application filed April 15, 1919. Serial No. 290,132.

*To all whom it may concern:*

Be it known that I, ANTONI FRONCZAK, citizen of the United States, residing at Wilkes-Barre, in the county of Luzerne and State of Pennsylvania, have invented certain new and useful Improvements in Harrows, of which the following is a specification.

This invention relates to improvements in agricultural implements and particularly to those used in scarifying the surface of the land after plowing, ordinarily termed harrows.

The principal object of the invention is to provide a form of harrow which is adapted to be drawn by a team of horses or other draft animals, the same having teeth engageable with the surface of the soil, for leveling the same so as to dispose of the ridges caused by a plow prior to seeding the land.

A further object is to provide means whereby the harrow may be transported over the roadway or field, without having the teeth come in contact with the surface, thereby rendering it possible to move the same without the difficulty usually entertained.

These and other like objects are attained by the novel construction and combination of parts hereinafter described and shown in the accompanying drawings, forming a material part of this disclosure, and in which:—

Figure 1 is a top plan view showing a harrow made in accordance with the invention.

Fig. 2 is a transverse sectional view taken on line 2—2 of Fig. 1.

Fig. 3 is an enlarged fragmentary side elevational view showing a corner of the harrow.

Fig. 4 is an end view of the same, and

Fig. 5 is a fragmentary view of the connecting bars.

The construction of the harrow here shown to be double, involves the use in each of three bars 10, arranged at equally spaced intervals, and secured upon them are longitudinal bars 11, four or more of which may be used and through which pass, at equally spaced intervals, the harrow teeth 12, the same being conical except for the stems secured in the bars and terminating in relatively sharp points.

Passing through the inner pair of longitudinal bars 11, are rods 14 and 14', the same being engaged together at their inner ends 15, one of the pairs of bars 14' having square opening, while the other bar 14 is turned angularly and fitted to enter the squared opening where it is held by a nut 16, so that the harrow elements may be disconnected and turned in one over the other.

Also attached to these bars, upon their outer extending ends, are short transverse bars 17, having a plurality of perforations 18 engageable with clevis 19 connected by links 20, with a whiffletree 21, having a central eye 22, engageable with the harness of draft animals in the usual manner.

The perforations 18 are to provide means for attaching with whiffletrees of different lengths, and for securing the same to one side of the center of the harrow elements.

Slidably engaged, near the outer ends of the elements 11, are rods 24 encircled by springs 25, and provided with enlarged heads 26 against which the upper ends of the springs abut, the lower ends resting against the bars 11, while the opposite extending ends of the rods 24 are formed with heads 27, having slots 28, and passing through the slots are pins 29, on which are rotatably mounted wheels 30, their normal positions being above points of the harrow teeth 12, but when in a lowered position, as by depressing the enlarged heads 26, the wheels extend to a point below the level of the teeth 12, and may be held therein by offset levers 32 pivotally mounted on pins 33 set in the lugs 34, the extreme outer ends of the levers having extensions 35 which are engageable within the loops 36, pivoted in the end of the bars 11, so that they can be swung over the levers, acting as latches in holding the heads 26 down and allowing the wheels 30 to be used in the manner of casters or truck wheels in moving the harrow over the surface of the soil.

From the foregoing it will be seen that the harrow can be compactly folded and run upon either set of the wheels, in the manner of a truck, or upon turning the loops 36, downwardly the wheels are easily retracted so that the harrow teeth project in order to perform their usual functions.

Having thus described my invention, what I claim as new and desire to secure by Letters Patent, is:—

In a harrow, the combination with a pair of foldable frames, a plurality of harrow teeth engaged in longitudinally disposed bars of said frames at spaced intervals therein, vertically mounted slidable rods in the corners of each of said frames, springs encircling said rods adapted to press them normally opposite to the teeth of said harrow, levers mounted adjacent to said rods, loops at the extremities of said bars engageable with said levers whereby said rods may be held in a depressed position, and wheels freely journaled in the lower portion of said rods adapted to be extended below said harrow teeth.

In testimony whereof I affix my signature in the presence of two witnesses.

ANTONI FRONCZAK.

Witnesses:
   P. W. McKeown,
   Frank Blajyiwski.